United States Patent [19]

Lewis

[11] 4,084,630
[45] Apr. 18, 1978

[54] LOCKING RING FOR A CASTELLATED NUT

[76] Inventor: Frederick M. Lewis, 741 Lincoln Rd., Grosse Pointe, Mich. 48230

[21] Appl. No.: 695,167

[22] Filed: Jun. 11, 1976

[51] Int. Cl.² ............................................. F16B 39/04
[52] U.S. Cl. .......................................................... 151/5
[58] Field of Search .................... 151/5, 6; 85/8.3, 8.1, 85/5 CP, 5 N

[56] References Cited

U.S. PATENT DOCUMENTS

| 1,390,609 | 9/1921 | France | 151/5 X |
| 1,718,408 | 6/1929 | Brawner | 151/5 |
| 3,695,140 | 10/1972 | Noble | 85/8.3 |

FOREIGN PATENT DOCUMENTS

| 1,576,873 | 6/1969 | France | 151/5 |
| 500,545 | 11/1954 | Italy | 151/5 |

*Primary Examiner*—Ramon S. Britts
*Attorney, Agent, or Firm*—Harness, Dickey & Pierce

[57] ABSTRACT

A locking ring for a castellated nut threadably connected to a bolt having a transversely extending aperture has a diametrically extending section located in the aperture with opposite end portions engageably located in opposing castellations formed on the nut. One of the end portions of the diametrically extending section overlies and springily cooperates with an annular shaped section located about the outer periphery of the castellated formation to lockingly secure the ring to the nut and preclude inadvertent removal. In one form of the invention, an end portion of the arcuately shaped section is folded radially inwardly to cooperatively engage one of the castellations and in another form the diametrically extending portion is centrally bowed so as to engage the inner periphery of the aperture and thereby minimize relative movement between the locking ring and the bolt.

1 Claim, 4 Drawing Figures

LOCKING RING FOR A CASTELLATED NUT

BACKGROUND AND SUMMARY OF THE INVENTION

The present invention relates generally to locking devices for nuts and bolts and more particularly to an improved locking ring cooperative with a castellated nut and a transversely extending aperture disposed in a bolt whereby to maintain the nut securely on the bolt.

It has been previously found that when nut and bolt assemblies are subjected to various vibrating forces and repetitive loadings, that there is a tendency for the nut to loosen and in some instances to disassociate from the bolt. To retard or avert the loosening of a nut, a large number of antiloosening methods and devices have been proposed including lock nuts and washers, cotter pins, tapered split pins, and various fibrous or plastic inserts located within the aperture of a nut, the inserts being adapted to press about and against the bolt threads whereby to frictionally secure the nut in place. Each of the prior methods and devices have been found to be disadvantageous, however, due to either a substantial increase in manufacturing costs or an inherent inability to withstand shock loads applied either directly or indirectly through the structure being connected.

In the U.S. Pat. No. 2,995,167 an alternative to the conventional non-loosening devices was provided in the form of a locking ring which was adapted to be seated about the outer periphery of a castle nut and which included a tongue engageable through opposing castellations thereof and a cooperating aperture disposed in the bolt. The assembly of this locking ring, however, created as assembly problem which necessitated the usage of a specially devised tong. Moreover, a standard castellated nut had to be modified to include a circumferentially extending groove to cooperatively seat an annular shaped section of the locking ring. The locking ring of the present invention is adapted to be assembled in combination with a standard castellated nut without the assistance of any specially devised tool thereby obviating the need of additional machining of the nut and the acquisition of special assembly tools. It, therefore, is a general object of the present invention to devise a locking ring of the above described character for a castellated nut which is easily assembled without the use of specially devised tools.

In another aspect of the present invention an end portion of the tongue is biased against and overlies an annular shaped section disposed about the outer peripheral surface of the castellated formation of the nut. When the locking ring is fully assembled, the compressive cooperation between the tongue and annulus lockingly retains the ring relative to the nut and precludes an inadvertent removal thereof. It, therefore, is another object of the present invention to provide a locking ring for a castellated nut having a self-retaining feature which inherently precludes inadvertent disassociation thereof.

In another form of the subject invention the tongue portion of the locking ring includes a generally curvilinear portion which is adapted to interferingly cooperate with the inner wall of the aperture formed in the bolt whereby to augment the locking retention provided by the compressive engagement between an end of the tongue and the annulus. Moreover, an end portion of the annulus can be folded inwardly to engage one of the castellations to further resist the application of imposed forces acting on the assembly. It, therefore, is a further object of the present invention to provide a locking ring of the above described character which due to its configuration is adapted to be securely and fixedly connected to a nut and bolt assembly.

The locking ring of the present invention is adapted to be utilized with a standard castle nut and a conventional standard drilled bolt. No additional machining of either the nut or bolt is required and the design of the locking ring facilitates manufacturing the components by mass production techniques. Hence, the locking rings can be inexpensively produced and attractively marketed. It is, therefore, still another object of the present invention to provide a locking ring of the above character which can be mass produced and competitively marketed.

Other objects, features and advantages of the present invention will become apparent from the subsequent description and the appended claims, taken in conjunction with the accompanying drawings.

DETAILED DESCRIPTION OF THE PREFERRED EMBODIMENTS

Figures 1, 2, 3, 4:
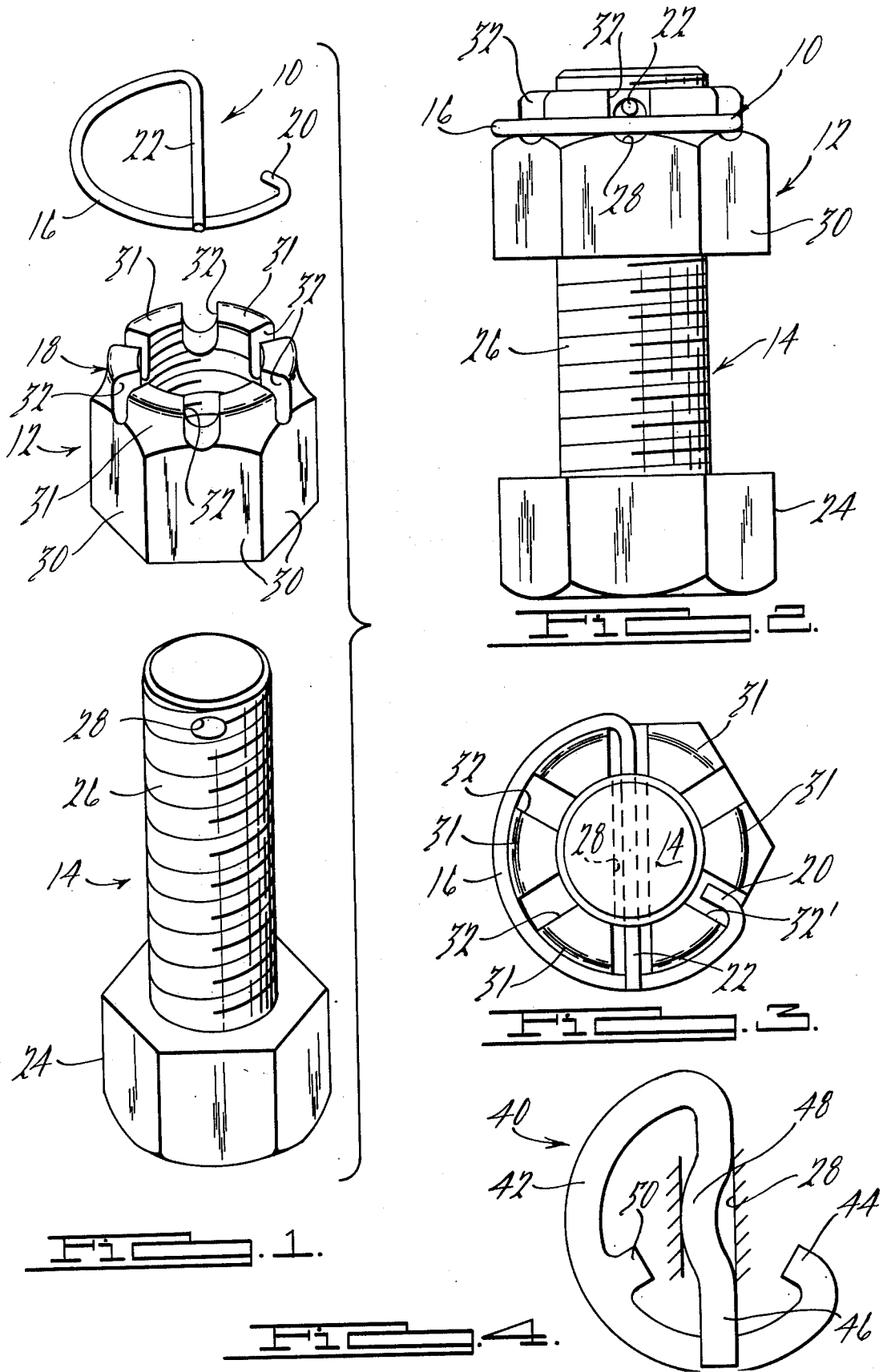
FIG. 1 is an exploded prospective view of the locking ring in accordance with a preferred embodiment of the present invention in combination with a conventional standard drilled bolt and a castellated nut.
FIG. 2 is an assembled side view of the elements illustrated in FIG. 1.
FIG. 3 is a top or plan view of the assembly illustrated in FIG. 2.
FIG. 4 is a plan view of a locking ring in accordance with another preferred embodiment of the present invention.

With reference now to the drawings wherein like reference numerals designate the same or corresponding parts throughout the several views, there is shown in FIG. 1, a locking ring 10 in accordance with a first preferred embodiment of the present invention, which is adapted to retain a castle nut 12 in fixed threaded engagement relative to a standard drilled bolt 14. The locking ring 10 is formed from a unitary piece of resilient material such as spring steel or the like and includes an annularly or circularly shaped section 16 formed on a diameter slightly less than the outside diameter of a castellated formation 18 disposed on the upper end of the nut 12 whereby to be adapted to be compressively urged therearound. An end portion 20 of the section 16 is folded radially inward and an opposite end is connected to a diametrically extending section 22. The length of the section 22 is slightly greater than the diameter of the section 16 and a free end thereof compressively overlies and extends slightly beyond the outer peripheral surface thereof to provide a self-locking feature as shall hereinafter become more fully apparent.

A particular advantage of the present invention resides in the fact that each of the castle nut 12 and exemplary bolt 14 can be of any standard type or conventional design with neither requiring any additional machining in the form of additional grooves, slots or recesses in order to facilitate receiving the ring 10. By way of example, however, the bolt 14 can be of the type having a hexagonal head 24 and an externally threaded shank 26, the latter including a transversely extending aperture 28 preselectively located and formed of a diameter in conformance with standard drilling practice. The castle nut 12 can also be hexagonally shaped whereby to define a plurality of similarly shaped side surfaces or flats 30 as is conventional in the art. The castellated formation 18 includes a plurality of arcuately shaped segments 31 with each adjacently located pair defining an inwardly extending slot 32. The slots 32 are arranged in diametrically opposed pairs to facilitate selective registration with the aperture 28 whereby to define a substantially continuous engageable passage means therewith.

In FIGS. 2 and 3, the locking ring 10, castle nut 12, and exemplary bolt 14 are shown in a finally assembled form. In this regard it will be seen that the nut 12 is threadably engaged to the shank 26 of the bolt 14 and rotatably positioned whereby opposing diametrically located slots 32 are in aligned registration with the aperture 28. The orientation permits the diametrically extending section 22 of the locking ring 10 to be engageably inserted therethrough and as the section 22 is advanced to a fully engageable position, the orientation permits the circularly shaped section 12 to be locatable about the outer peripheral surface of the formation 18. When the ring 10 is fully and properly seated, the end portion 20 is engaged in a slot designated 32' for clarity, the latter being located adjacent to the pair of aligned slots 32 receiving the section 22. As finally installed, the free end of the section 22 is located above or at the upper end of the nut 12 as viewed in FIG. 2 in order to be compressively cooperative with the section 16 and lockingly retain the ring 10 to the nut 12. This aspect of the present invention is exceedingly important in that it permits the locking ring 10 to withstand shock loads, vibratory and cyclic forces including centrifugal forces and results in a positive fixed positioning of the nut 18 relative to the bolt 20. This cooperative compressive relationship is also augmented by the circular section 16 which compressively bears on the outer periphery of the castellated formation 18.

In FIG. 4, a locking ring in accordance with a second preferred embodiment of the present invention is indicated generally at 40. The locking ring 40 is formed from a generally flat stock material and is shaped substantially in conformance with the locking ring 10. The ring 40 is comprised of an annular shaped section 42, an end section 44 which extends radially inward from one end of the section 42, and a diametrically extending section 46 connected at one end to the annular shaped portion 42. The central portion of the section 46 is arcuately shaped as indicated at 48 and defines a crown which is adapted to provide an interference fit between the section 46 and the aperture 28 formed in the bolt 14. If desired, an additional inwardly extending engagement tab 50 can also be provided in the locking ring 40 to further augment the retention of the ring 40 relative to the nut 12 and bolt 14. Again, as was previously discussed in conjunction with the locking ring 10, the free end section of the section 46 also overlies and compressively engages the annular shaped section 42. Thus, it will be noted that an analogous degree of retention is incorporated in the configuration of the locking ring 40 which results in the same advantages enumerated for the ring 10.

It will be noted that each of the locking rings 10 and 40 are adapted to be used repeatedly as there is no failure of either of the parts during installation or removal. Either of the locking rings 10 and 40 can be dimensioned in such a manner as to preclude usage with a wrong size bolt-nut combination and each can be formed of a structural strength to provide a particular shear failure level for each size of a nut and bolt. No special tools are required with all types of locking rings 10 and 40 and in some instances with particular respect to the smaller sizes, the assembly can be accomplished without the assistance of any auxiliary tool. In view of the simplicity of the present invention, it will be noted that installation time is reduced to an extreme and that either of the locking rings 10 and 40 are subject to be utilized in locations where installation tools cannot be used due to restrictive clearance spaces. With respect to additional applications, it will be noted that the locking rings are subject to also be utilized on a drilled shaft whereby to secure a rotary element and also can be used to assemble chain links and the like.

Another particularly important feature of the present invention resides in the fact that the locking rings are completely reuseable. That is, installation and removal thereof does not in any way result in stressing the material of the rings beyond its yield point. Accordingly, the effective operational life of the present invention far exceeds comparable devices of the prior art.

It is to be noted that the size of the slots 32 and aperture 28 may be varied without departing from the scope of the present invention, as can the cross sectional size of the material from which the ring 10 is fabricated. It is again emphasized that the present invention is not specifically limited to bolt and nut applications, since the principles of the present invention are wide and varied, such as, for example, in the front wheel spindles of automobile vehicles. Additionally, it is to be appreciated that the present invention is not necessarily limited to male and female threaded members, and that while preferred use of the present invention involves the free end section of the diametric section overlying the associated annular section, at least some degree of locking and retention is achieved without having the end section located above the annular section.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A fastener assembly including a castellated nut threadably connected to a bolt having a diametrically extending aperture, said nut having a plurality of radially extending notches and an annular peripheral recess formed at one end thereof, said recess being defined by a substantially radially outwardly extending portion, a substantially axially extending portion and an intermediate arcuate connecting portion, and a locking element for fixedly securing said nut at a preselected threaded position on said bolt, said locking element having a diametrically extending section located within said aperture and having opposite end portions engageable with diametrically opposed notches of said nut, a circumferentially extending section located within said annular recess and extending greater than 180° and less than 270+ around said nut, one end of said circumferentially extending section being connected to one of said opposite end portions, and the opposite end of said circumferentially extending section being retained within said recess and being located between the periphery of said recess and the other of said end portions, with the terminus of said opposite end of said circumferentially extending section comprising a first radially inwardly extending locking tab portion disposed within one of the notches located on the diametrially opposite side of said nut from the major portion of said circumferentially extending section of said locking element, the terminus end of said diametrically extending portion extending radially outwardly from said axial portion of said recess and located on the axially opposite side of said annular recess and serving to retain said circumferentially extending section from said radially outwardly extending portion of said recess so as to overlie said circumferentially extending section and thereby serve to maintain said circumferentially extending section engaged with said radial portion of said recess, and a second radially inwardly extending locking tab portion formed on said circumferentially extending section symmetrically of said first locking tab portion and disposed within one of the other of said notches.

* * * * *